May 27, 1947.    J. R. SUTHERLAND    2,421,298
TRANSFORMER
Filed Dec. 4, 1944    2 Sheets-Sheet 2
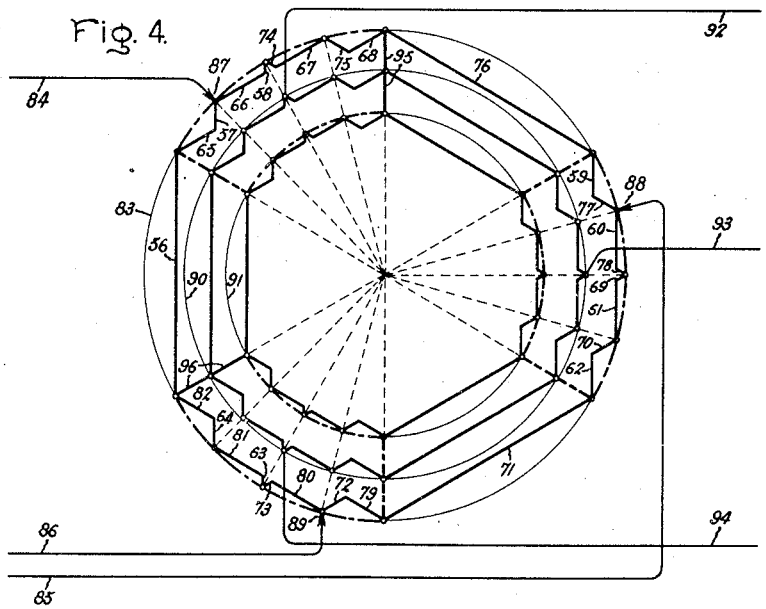
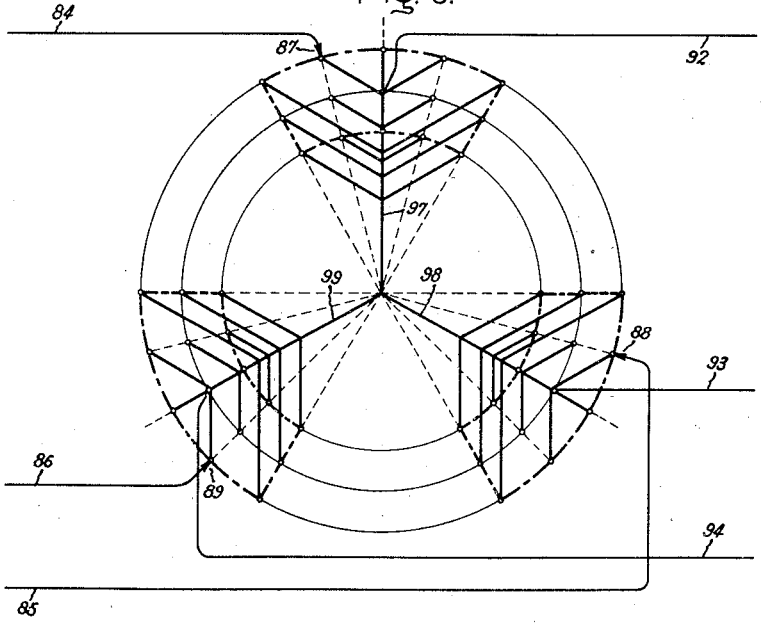
Inventor:
James R. Sutherland,
by Harry E. Dunham
His Attorney.

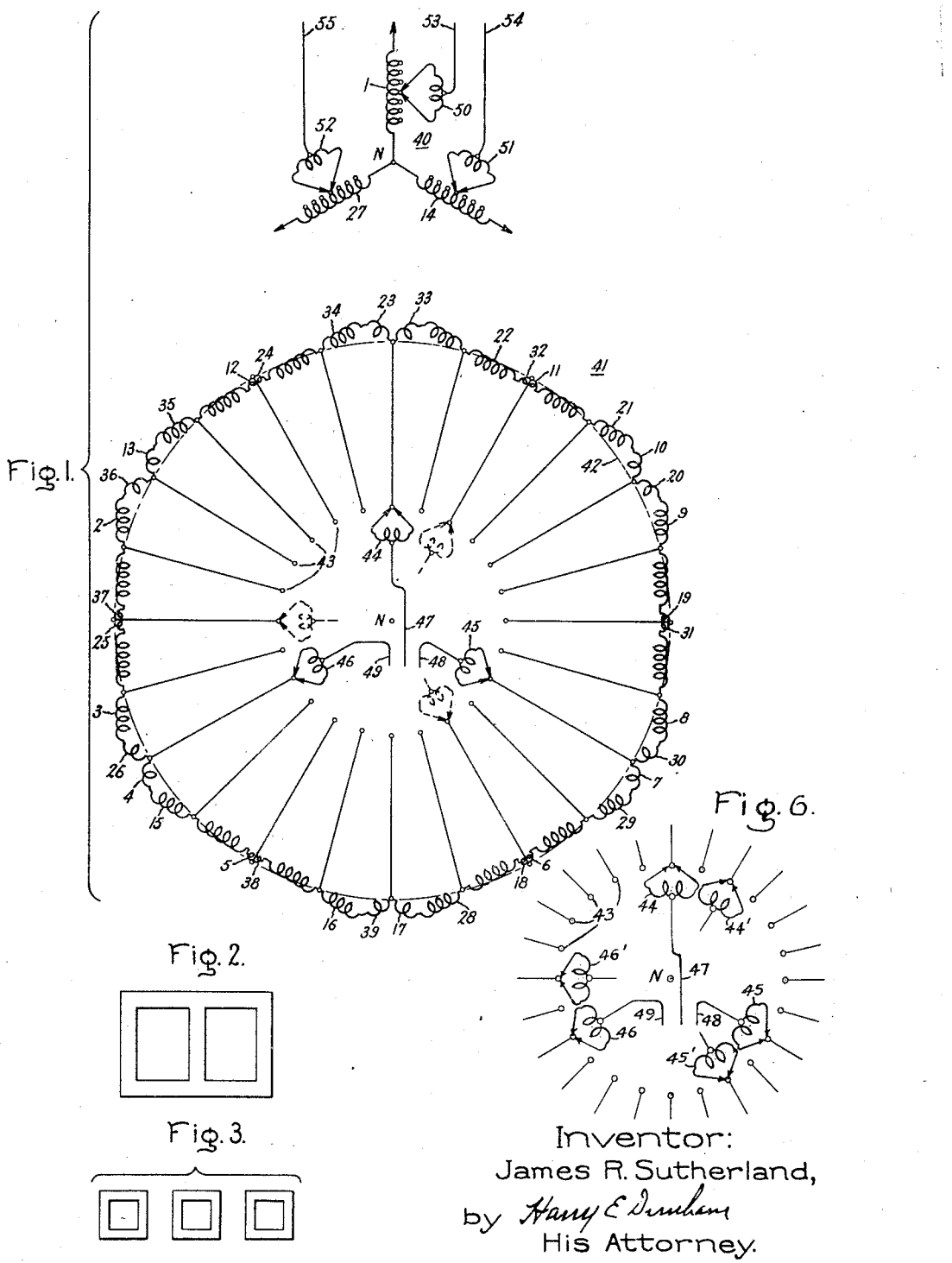

Patented May 27, 1947

2,421,298

UNITED STATES PATENT OFFICE 2,421,298

TRANSFORMER

James R. Sutherland, New Lebanon, N. Y., assignor to General Electric Company, a corporation of New York Application December 4, 1944, Serial No. 566,476

10 Claims. (Cl. 171—119)

1

This invention relates to electric transformers and more particularly to improvements in voltage phase shifting transformers for polyphase circuits.

One way of shifting the phase of a balanced polyphase voltage is to provide a conventional-type mesh-connected polyphase winding with a plurality of phase displaced sets of terminals. All of the terminals of all of the sets have the same voltage magnitude with reference to a common neutral point and the voltages of the terminals in each set are displaced in phase from each other by $$\frac{360}{N}$$

electrical degrees where N is the number of phases of the system so that the voltages of the terminals of each set constitute a balanced polyphase voltage. Voltage phase shift is accomplished by transferring polyphase circuit connections from one set of terminals or taps to another.

A conventional-type mesh connection is characterized by interconnecting the phase windings in such a way that in proceeding completely around the closed mesh the various phase windings occur always in the same phase sequence and there are only two windings per phase in the mesh. The result is that in a system of relatively few phases, like a conventional three-phase system, there is a relatively limited number of such sets of terminals with the result that the phase of the polyphase voltage can only be shifted at constant magnitude in relatively large steps.

In accordance with one aspect of this invention there is provided what can be called a zigzag mesh connection. This is characterized by having more than two windings per phase and interconnecting the phase windings in such a way that in proceeding completely around the closed mesh the windings on each phase occur in different phase sequences. By properly proportioning such phase windings the number of points on the mesh, whose vector voltages lie on a cycle centered on the neutral point of the mesh can be made any amount desired without increasing the number of phases. In this manner voltage phase shift at constant magnitude can be secured in as small steps as desired.

Another feature of the invention is using a voltage-phase-shift at constant magnitude winding as the primary winding of a transformer, the phase of whose secondary winding voltage is to be shifted. In this manner the core flux remains constant and independent of the amount of phase

2 shift. Voltage magnitude control can be secured by varying the effective turns of the secondary winding of the transformer.

An object of the invention is to provide a new and improved electric transformer.

Another object of the invention is to provide a new and improved polyphase transformer system for shifting the phase at constant magnitude of a balanced polyphase voltage.

A further object of the invention is to provide a special type zigzag-connected polyphase transformer winding.

An additional object of the invention is to provide an improved transformer system for selectively varying the phase of a balanced polyphase voltage at constant magnitude and varying the magnitude of this voltage at constant phase angle.

The invention will be better understood from the following description taken in connection with the accompanying drawing and its scope will be pointed out in the appended claims.

In the drawing Fig. 1 is a diagrammatic illustration of an embodiment of the invention in which the various phase windings of the transformer have their axes arranged parallel to their respective vector voltages so that although the figure shows the actual electrical connections it also can be used like a vector diagram, Figs. 2 and 3 show alternative core arrangements, Figs. 4 and 5 are vector diagrams of modifications of the invention, and Fig. 6 is a diagram of a modification of Fig. 1.

Referring now to Fig. 1, phase windings or coils 1–13 inclusive belong to one of the phases of the system, which system is shown by way of example as a three-phase system, and this particular phase is the one whose vector voltage is vertical, as viewed in the drawing. Windings 14–26 inclusive belong to another phase whose vector voltage is displaced 120 electrical degrees in a clockwise direction from the first phase, and phase windings 27–39 inclusive belong to the remaining phase and, as shown, the vector voltage of this phase is displaced 120 electrical degrees from that of the other two phases. In the case of a single polyphase transformer construction the windings of each phase will be on a different one of the winding legs of a three-legged core, an example of which is shown in Fig. 2, but this is not necessary and, if desired, three single-phase transformers can be used, each of which has wound on its core the windings belonging to the three different phases of the system, as indicated by the three single-phase transformer cores in Fig. 3.

Windings 1, 14 and 27 are interconnected to form one of the polyphase windings of the transformer system and, as shown by way of example, this is a Y-connected winding 40. The remaining windings are interconnected to form the other polyphase winding 41 of the transformer and, as shown, this is a mesh-connected winding which is further characterized by being a zigzag mesh-connected winding. For the particular case shown it is characterized by having taps or terminals, all at an equal voltage difference with respect to a neutral point of the mesh, which are displaced from each other by an angle of 15 electrical degrees. These terminals are shown as the points where a circle 42 centered on the geometrical center or neutral point of the mesh touches the mesh. For example, starting with phase winding 2, one of these points is an intermediate point on this winding which is shown as located where the circle 42 intersects the winding 2. Another of these points is the junction of phase windings 25 and 37 and still another point is the junction of phase windings 4 and 26. It will thus be seen that some of the points are intermediate points on the phase windings and some of the points are junction points of certain of the phase windings and these junction points are formed by phase windings which either in effect move the points in toward the circle, as in the case of phase windings 4 and 26, or move the points out onto the circle, as with phase windings 25 and 37.

These constant voltage points which are equally phase displaced are shown connected to respective tap contacts 43. These are selectively engageable by a three phase tap changer which comprises three similar ratio adjusters or load-ratio-control mechanisms 44, 45 and 46 which are displaced from each other by 120 electrical degrees and which may be of any suitable type. These are connected respectively to the line conductors 47, 48 and 49 of a three-phase circuit.

The phase windings 1, 14 and 27 of the winding 40 are also shown as being provided with a plurality of similarly displaced taps which are engaged selectively by a three phase tap changer which comprises respective ratio adjusters or load-ratio-control mechanisms 50, 51 and 52 of any suitable and well-known type. These ratio adjusters in turn are connected to the line conductors 53, 54 and 55 of a three-phase circuit, usually through mid-tapped reactors as shown and through arcing contactors (not shown).

The operation of the invention is as follows: If the three ratio adjusters 44, 45 and 46 are moved equally in the same direction along the path on which the tap contacts 43 lie there will be a shift in phase of the polyphase voltage of the line conductors 47, 48 and 49 relative to the phase of the windings of the transformer, the phase shift for the particular case illustrated being 15 electrical degrees for each set of three symmetrically located tap contacts 43 which are engaged by the ratio adjusters 44, 45 and 46. Thus, for example, if they are rotated clockwise, as viewed in the drawing, to the positions shown in dotted lines a 30-degree phase shift will take place with no change in magnitude of the voltage. In this manner the phase shift can be extended over a range of 360 degrees, if desired.

The polyphase mesh winding 41 may, if desired, be used as an autotransformer, in which case, for example, the ratio adjusters 44', 45' and 46' shown in Fig. 6 can constitute a second set of ratio adjusters which are connected respectively to the line conductors of the rest of the circuit, the first part of which is made up of conductors 47, 48 and 49. In such a case the phase shift produced by the winding 41 will be the angular relation (electrically) between the set of ratio adjusters 44—45—46 and the set of ratio adjusters 44'—45'—46', and obviously these can be moved toward or away from each other or past each other so as to obtain positive and negative angles of phase shift.

It will be obvious to those skilled in the art that the invention is not limited to the particular form of zigzag mesh connection shown for polyphase winding 41. For example, in many cases it is not necessary to shift the phase of the voltage throughout 360 degrees and it may be sufficient to shift the phase of the voltage, say, over a range of ±30 degrees in small steps of a few degrees each. This can readily be accomplished by providing as many zigzag connected phase windings as are necessary to provide junction points or terminals as close together as desired on the circle 42 within the range of ±30 degrees of any assumed zero-degree position. The terminals of these three 60 degree zigzag sections can then be interconnected by three continuous phase windings each belonging to a different phase.

The output voltage magnitude of the transformer shown in Fig. 1 may be varied at will by moving the ratio adjusters 50, 51 and 52 equally toward or away from the center or neutral point of the Y connection of the windings 1, 14 and 27. Power may flow either from winding 40 to 41 or in the opposite direction and the latter direction has the advantage that with winding 41 the primary winding the excitation of this winding will be constant for all symmetrical positions of the ratio adjusters 44, 45 and 46 so that the transformer core will be worked at constant flux density.

It is, of course, not essential to the invention that the taps to which the contacts 43 are connected be formed in all the three ways shown in the drawing, namely, by a tap at an intermediate point in a phase winding and taps at junctions of phase windings which are so selected as to bring the junction point in toward the circle and out toward the circle respectively and either one of the latter two arrangements may be used alone as many times as necessary, if desired, or they may be used in any combination. However, all such zigzag mesh connections will have N-angled symmetry when N is the number of phases of the system. That is to say, each portion of the mesh extending over $$\frac{360}{N}$$

electrical degrees will be similar to the remaining N–1 portions.

An example of the zigzag mesh connection which provides ±30 degree phase shift for the voltage of a three-phase circuit is shown in Fig. 4. This figure is a vector diagram in which each of the continuous straight lines represents the vector voltage of a different winding. The vectors 56, 57, 58, 59, 60, 61, 62, 63 and 64 belong to one one of the three phases, the windings 65, 66, 67, 68, 69, 70, 71, 72 and 73 correspond to the second phase and the vectors 74, 75, 76, 77, 78, 79, 80, 81 and 82 correspond to the remaining phase. As in Fig. 1, it will be seen that certain of the junctions of the vector voltages of the windings lie on a common circle 83 but these points, instead of being equally spaced around the circle, occur in three groups, the groups being displaced 120 degrees in phase from each other and the points in each group being equally angularly displaced from each other. In this particular case the equal spacing is 15 angular degrees. The conductors 84, 85 and 86 of a three phase circuit are respectively connected to symmetrically located junction points on the circle 83. As shown schematically, these conductors are connected respectively to contact fingers 87, 88 and 89 so that the phase of the polyphase voltage of the circuit may be shifted by moving the contact fingers 87, 88 and 89 from tap to tap on the winding system; that is to say, from point to point on the circle 83, it being understood that the windings which are represented by the vectors in Fig. 4 are provided with taps at points corresponding to the points on the circle 83 and these taps are connected to tap contacts which are selectively engaged by the contact fingers.

By providing additional similar zigzag mesh connections, the voltage of whose windings is progressively less, it is possible to produce a multiple zigzag connection, which is also shown in Fig. 4. Thus, a second mesh connection which is similar to the first one may be provided so that certain junction points of its vector diagram lie on a circle 90, and another one, even smaller, may be provided whose vector diagram is inscribed in a circle 91. Obviously, any number (M) of concentric zig meshes may be provided. In this manner three groups of points (or N groups for an N-phase system) are formed which are bounded by symmetrically located sectors of a common annulus, these sectors being defined by the dot and dash lines in Fig. 4. A second three-phase circuit having conductors 92, 93 and 94 may be provided and this circuit is preferably so connected to the system that its individual conductors are connected respectively to symmetrically located points in the system.

If, now, the contact fingers 87, 88 and 89 are moved radially from point to point in the system, the voltage ratio of the two three-phase circuits will be changed without changing the phase displacement of the polyphase voltages of these circuits. On the other hand, when the contact fingers 87, 88 and 89 are moved circumferentially from point to point, then the polyphase voltages of the two circuits are displaced in phase without changing the ratio of these voltages.

In order to insure concentricity of the circles 83, 90 and 91 it is best to provide auxiliary windings having vector voltages 95 and 96 for tying the three concentric zigzag meshes together at at least two points.

The invention is not limited to a mesh connection end, as shown in Fig. 5, it can also be in the form of a zigzag star connection, either single or multiple. In this figure the two three-phase circuits are the same as those for Fig. 4 and there are three main phase windings 97, 98 and 99 which are Y connected. Radiating in both directions from each of these vectors are vectors which are parallel to the other two main ones and terminate in points lying within three symmetrically located sectors of a common annulus. Thus, operation of the contact fingers 87, 88 and 89 in the same manner as in Fig. 4 will produce the same kind of operation, namely, voltage magnitude control with radial motion and voltage phase shift control with circumferential motion.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. An N phase transformer system having at least $N^2$ interconnected windings, said windings and their interconnections being characterized by a voltage vector diagram of N angled symmetry having at least $N^2$ points on a common circle, said points being divisible into N phase displaced groups of N points each, the N points in any group being displaced $$\frac{360}{N}$$

degrees from each other, and means for selectively connecting a polyphase circuit to said system at places corresponding to any of said groups of points so as to obtain polyphase voltage phase shift at constant voltage magnitude.

2. An N phase transformer system comprising, in combination, N groups of windings, each group having at least one winding per phase, said windings being of such size and being so interconnected that the vector diagram of their voltages has at least $N^2$ points lying on a common circle, said points being symmetrically located over a range of $\pm A$ degrees of N spots which are $$\frac{360}{N}$$

degrees apart on said circle, tap contacts connected to said windings at places corresponding to said points, and a polyphase tap changer having N contact members for selectively engaging any set of N of said tap contacts which are connected to places corresponding to symmetrically located points on said circle.

3. In combination, a polyphase transformer system having as many core flux paths as said system has phases, at least three windings on each of said paths, said windings being interconnected to constitute a closed zigzag mesh connection, said windings being of such relative voltages that the voltages between certain of their junctions and a neutral point are equal.

4. An N phase transformer system comprising, in combination, core means having N winding legs, at least three N coils on each leg, all of said coils being so connected in a closed zigzag mesh that their vector voltages form a polygon of N-angled symmetry having at least three N points lying on a circle, tap contacts connected to said mesh where the voltages correspond to said points, and tap-changing means for selectively connecting the line conductors of an N phase circuit to any set of N ones of said tap contacts which are electrically equally spaced in said mesh.

5. A polyphase transformer system having inductively coupled primary and secondary windings, one of said windings having a plurality of sets of polyphase terminals whose respective polyphase voltages are equal in magnitude and displaced in phase, the other of said windings having a plurality of sets of polyphase terminals whose respective polyphase voltages are unequal in magnitude and the same in phase, and separate polyphase tap changer mechanisms for selectively connecting the line conductors of polyphase input and output circuits to the different sets of terminals of the respective windings whereby the operation of one tap changer mechanism changes the phase of the polyphase output voltage of the transformer system at constant magnitude and the operation of the other load-ratio-control mechanism changes the magnitude of the polyphase output voltage of the transformer system at constant phase angle.

6. The combination as in claim 3 in which the winding whose sets of polyphase terminals have voltages of equal magnitude and differences in phase is the primary winding of the transformer system whereby the core flux of the transformer system is constant throughout the range of operation of both load-ratio-control mechanisms.

7. A polyphase transformer having a primary winding and a secondary winding on the same core, one of said windings have a plurality of sets of polyphase terminals whose voltages are equal in magnitude and displaced in phase, the other of said windings having a plurality of sets of polyphase terminals whose voltages are unequal in magnitude and the same in phase, and separate load-ratio-control mechanisms for selectively connecting the line conductors of polyphase input and output circuits to the different sets of terminals of the respective windings whereby the operation of one load-ratio-control mechanism changes the phase of the polyphase output voltage of the transformer at constant magnitude and the operation of the other load-ratio-control mechanism changes the magnitude of the polyphase output voltage of the transformer at constant phase angle.

8. The combination as in claim 7 in which the winding whose sets of polyphase terminals have voltages of equal magnitude and difference in phase is the primary winding of the transformer whereby the core flux of the transformer is constant throughout the range of operation of both load-ratio-control mechanisms.

9. In combination, a polyphase transformer winding having a plurality of sets of taps, the taps in each set having in-phase voltages of different magnitude, the in-phase tap voltages of each set being phase displaced from the in-phase tap voltages of the other sets, tap contacts connected respectively to said taps, and a polyphase tap changer for selectively making contact with said tap contacts, said tap contacts being so arranged that movement of said tap changer in one manner will vary the phase of the polyphase voltage of a circuit associated with said winding at constant magnitude and movement of said tap changer in another manner will vary the magnitude of said polyphase voltage at constant phase.

10. In combination, a polyphase multiple zig-zag transformer winding having a plurality of equally numbered sets of taps, the taps in each set having in-phase voltages of a constant difference in magnitude, the in-phase voltages of the taps of each set being phase displaced from the in-phase voltages of the taps of other sets, tap contacts connected respectively to said taps, and a polyphase tap changer for selectively making contact with said tap contacts, said tap contacts being so arranged that movement of said tap changer in one direction will vary the phase of the polyphase voltage of said winding at constant magnitude and movement of said tap changer in another direction will vary the magnitude of the voltage of said polyphase winding at constant phase.

JAMES R. SUTHERLAND.

REFERENCES CITED

The following references are of record in the file of this patent:

UNITED STATES PATENTS

| Number | Name | Date |
| --- | --- | --- |
| 2,196,029 | St. Palley | Apr. 2, 1940 |
| 2,292,829 | Garin | Aug. 11, 1942 |